Nov. 25, 1930.  J. A. FLANZER  1,782,778

RADIO DIALING DEVICE

Filed Sept. 14, 1928

INVENTOR
Joseph A. Flanzer
BY
ATTORNEYS

Patented Nov. 25, 1930

1,782,778

UNITED STATES PATENT OFFICE

JOSEPH A. FLANZER, OF BROOKLYN, NEW YORK, ASSIGNOR TO TECHNIDYNE CORPORATION, OF NEW YORK, N. Y., A CORPORATION OF NEW YORK

RADIO DIALING DEVICE

Application filed September 14, 1928. Serial No. 305,877.

This invention relates to indicating devices useful in radio broadcast receivers and particularly to the construction of the controls of the radio broadcast receiver and the indicating device associated therewith.

It is an object generally of my invention to associate with such devices, as radio broadcast receivers, an indicating device for the controls thereof, making the settings readily and accurately determinable and visible over a wide angle of observation assumed by the operator. It is contemplated by my invention to overcome the inconvenience encountered in reading an indicator device mounted upon the panel and a perpendicularly disposed control shaft extended therethrough for operating the same, due to the limited angles of vision these indicators present; and to provide an indicator which may be facilely observed and accurately adjusted with greatest comfort to the operator. The shortcomings of prior devices may be attributed to the position of the radio broadcast receiver or other instrument upon its support and the angle from which it is observed by an operator when standing or sitting in front of the instrument to take the readings or set the controls. Thus, in the type of radio broadcast receiver having the control shaft perpendicularly disposed to the panel and utilizing a disk-like indicating device, convenience of reading from positions above the instrument, as when the operator is standing, was made if at all, only at a sacrifice to accuracy of reading of the indicator, and with the result that the angle of observation for the indicator was very limited and uncomfortable.

It is, therefore, more particularly a further object of my invention to provide an indicating or dialing device for such instruments as radio broadcast receivers including a control shaft perpendicularly disposed to the panel thereof, having dial readings disposed to be observed over a very wide angle of vision from points about the normal line of observation. It is contemplated by my invention in its preferred embodiment to associate with a control rod of a radio broadcast receiver perpendicularly disposed to the panel, a dialing or indicating device comprising a dished, disk-like member, which preferably is outwardly dished, presenting a dialing surface which is visible through a large angle of observation disposed above a horizontal line, presenting the line of reference or zero point to the observer, whether he be standing or sitting, whereby setting of the instrument or dialing may be accomplished with great facility, ease and accuracy. It is a still further object of my invention to associate with the control device of an instrument, such as a radio broadcast receiver, a dialing indicator of the disk type, which preferably is outwardly dished, and which will present the indicator marks with maximum visibility over a large angle of observation and permit accuracy of setting of the dialing device with some zero point of reference, with ease and comfort, the reading of the control and adjustment thereof being facilitated by artificial illumination.

Other objects of my invention include the provision of a dialing device for radio broadcast receivers or the like whereby micrometric settings may be obtained with facility and ease and the accuracy necessary for best reception, these being attainable over a wide angle of observation. It is contemplated by my invention to provide a wave length control and indicator dial therefor including a large disk mounted upon the control shaft and reduction means for driving the disk, the disk having associated therewith a portion formed dished and preferably of translucent material upon which markings are provided to present the markings angularly to the normal line of observation on the frontal panel and below the same, the translucent material permitting transmitted artificial illumination from a pilot lamp. The translucent material is preferably outwardly dished, with the makings interiorly thereon, the resulting position providing a wide angle of observation from either standing or sitting positions of the operator.

To attain these objects and such further objects as may appear herein or be hereinafter pointed out, I make reference to the accompanying drawing forming a part hereof, in which—

Figure 1:
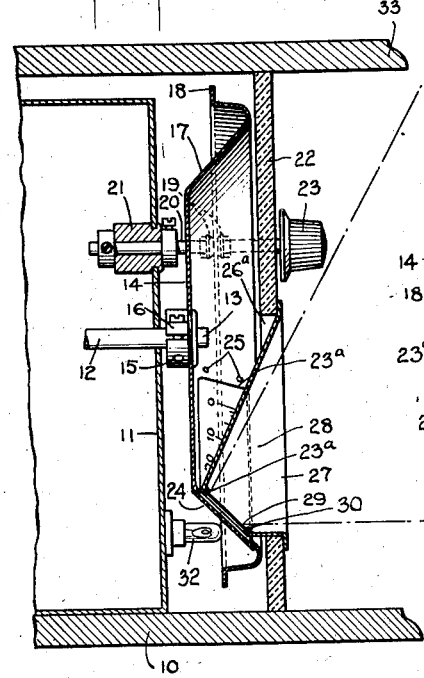
Figure 1 is a fragmentary sectional view through a radio broadcast receiver showing my device.

Making reference to the drawings, my invention may be best illustrated in connection with a radio broadcast receiver 10 (a fragment thereof only being shown) whose tuning elements may be included by the casing 11, through which there extends a control shaft 12, such as for governing the relative positions of a variable condenser or similar circuit tuning elements. My device is best suitable for use with a receiver wherein a control shaft 12 is generally perpendicularly disposed to the frontal panel of the receiver and arranged for wavelength settings by rotation of the shaft. For this purpose, the end of the shaft 13 has mounted thereon a dial or disk 14, arranged for being made fast to the shaft 12 by the split collar 15, a clamping screw 16 being provided to make the disk 14 and the collar 15, on which it is mounted, adjustable for calibration and the like, as will be readily understood.

The disk 14 is extended and dish-shaped, preferably including an outwardly dished conically shaped portion 17, and an edge 18 at the periphery thereof, arranged to be driven by double spring driver wheels 19 mounted upon the shaft 20, having rotatable mounting in the bearing collar 21, affixed in the casing. The free end of the shaft extends substantially perpendicularly through the panel 22 and is provided with a turn button 23. It will be understood that it is desirable to have the reduction ratio of the wheels 19 to the peripheral edge 18 such that substantially micrometric adjustment of the control shaft may be obtained by movement of the turn button 23.

The outwardly dish-shaped or conical portion previously described may have its interior surface provided with dialing markings representing calibrated wavelengths or frequencies or similar reference lines for fractionating the movement of the control shaft 12. Preferably, however, the dished portion is cut away at 23ª for a portion of its area, as shown, at about one half of the same. I position over the opening thus provided a strip of translucent material 24, held in position as by the rivets 25. The strip includes the dialing markings 26, arranged for wavelength or frequency figures, as described.

In use with the outwardly dished disk, the strip, as indicated, is mounted to be disposed below the axial line of the shaft 12 and behind the panel 22, and to make this visible, I provide in the panel an opening 26ª, of a size which will make the dial portion, including the markings, visible over a wide angle or range of observation, particularly above the position assumed by the markings. This will be more readily understood as this description proceeds. Into the opening 26ª I dispose an escutcheon plate 27, having interiorly directed walls 28 and the bottom window portion 29, in which there is mounted in the beads 30, a transparent strip of material, such as glass or celluloid, having marked thereon the zero reference line 31. This bottom window portion is disposed at an angular position, substantially parallel to the dished portion of the dial 17, previously described, and is of a size to make visible a small radial section of the dial. Rearwardly of the dial and immediately behind the window portion, I provide a source of illumination in the form of a pilot lamp 32. It will be observed that this, when illuminated, will serve to transmit light through the translucent strip 24 and make the markings visible through the window 29. It will be further observed that dial markings disposed below the axial line of the shaft 12 and having the clearance as shown by the escutcheon plate permits the eye of the observer to view the reference line 31 and the dial markings immediately under the same, with as great facility from a point above the axial line as at the normal line thereof. Furthermore, it will be observed that with the receiver disposed interiorly of the cabinet 10, which may have over-projecting portions 33, these projecting portions do not obstruct the line of vision from a point above the receiver whereby the observer may, with facility and ease, observe the dial markings and adjust the same in reference to the zero point with as great accuracy and comfort as if he were sitting down and had his eye at the level of the dial markings.

In this manner I have provided a radio broadcast receiver and indicator therefor wherein the dialing device is easily and comfortably observed for accurate control thereof, the same being capable of proper illumination either by the pilot lamp as described or by reflected light from outside sources, exteriorly of the receiver.

Figure 3:
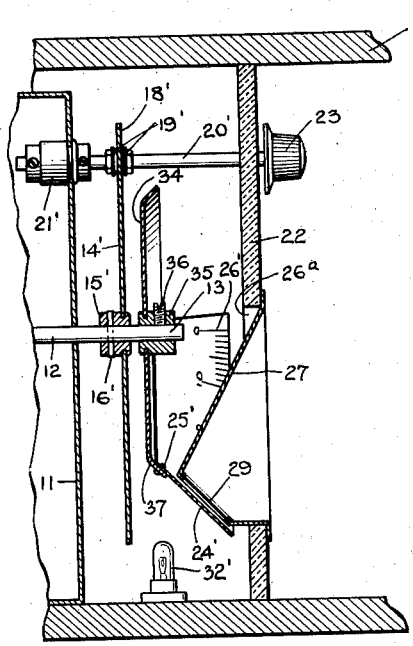
Figure 3 is a view similar to Figure 1 of another embodiment of my invention.
Figure 4:
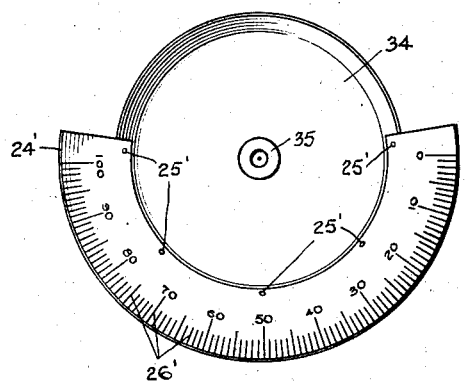
Figure 4 is a frontal elevation of a dial used in the embodiment shown in Figure 3.

In Figures 3 and 4 I have illustrated another embodiment of my invention in which form the shaft 12, similar to that above described for governing the relative positions of a control, such as variable condenser, has mounted upon the free end 13, a disk 14′ arranged for being made fast to the shaft by the collar 15′, which is keyed to the shaft by the pin 16′. The disk 14′ is generally circular in contour and has its peripheral edge 18′ arranged to be driven by double spring driver wheels 19', mounted upon the shaft 20', having rotatable mounting in the bearing collar 21', affixed in the casing 11. The free end of the shaft extends substantially perpendicularly through the panel 22 and is provided with a turn button 23, as in the embodiment previously described. It will be understood that it is desirable to have the reduction ratio of the wheels 19' to the peripheral edge 18', such as to obtain substantially micrometric adjustment of the control shaft by a slight movement of the turn button 23.

In this embodiment, forwardly of the shaft 12 I dispose a disk 34, which has shaft mounting means in the form of a collar 35, which may be held in the fixed or adjustable position by the set screw 36. The periphery of the disk 34 is slightly outwardly dished at 37, at an angle substantially the same as the dished portion described in connection with the embodiment illustrated in Figures 1 and 2. To the slightly dished portion, preferably for about one half of its area, I affix a strip of translucent material 24', which is held in position by suitable fastening means, such as rivets 25'. Interiorly of this outwardly dished strip, I dispose dial markings 26', which it is understood may be mere reference lines or calibrated for wave lengths or frequencies, as desired. The curvilinear or conical position assumed by the strip 24' in reference to the dished portion 37 will make this strip substantially rigid and self-sustaining. Forwardly of this strip and within the panel 22, there is positioned the opening 26ª and the escutcheon plate 27 and the members carried thereby, such as the window 29 and reference line 31, of the same form and character as described in connection with the previous embodiment.

Rearwardly of the strip 24' I dispose a source of illumination, such as the pilot lamp 32', which serves to transmit light through the strip 24', outwardly, to be observed through the window 29.

By the construction shown in Figures 3 and 4, I am assured of a fixed, relative position of the shaft 12 and its driving disk 14', at the same time permitting calibration of the celluloid strip for adjustment without chances of disturbance after the calibration has been made as the strip carrying the markings is not submitted to any load during rotation by the turn button 23.

Figure 2:
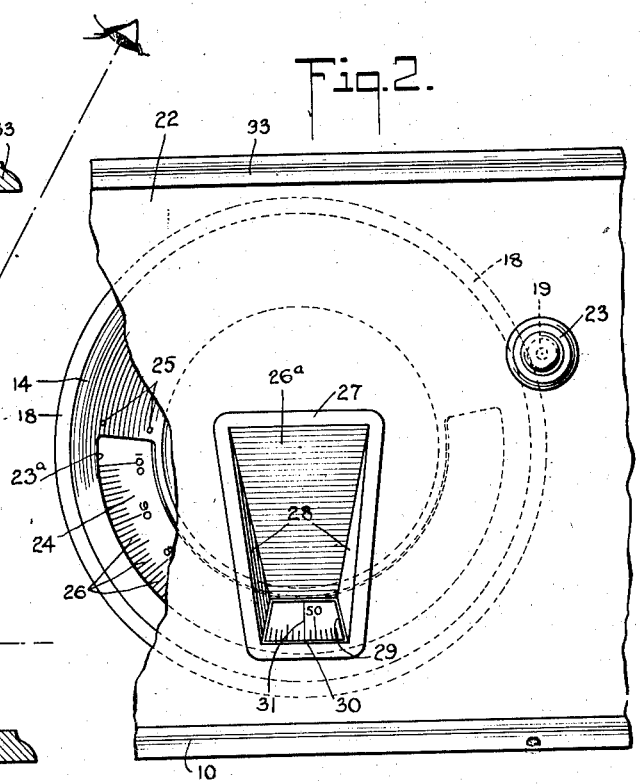
Figure 2 is a front elevation of the same.

It will be understood by the construction shown in Figures 3 and 4 that there are all the advantages present in the device illustrated in Figures 1 and 2, with the added advantage of assuring no displacement of the strip, including the markings, after calibrations of the same have been made relatively to the control shaft 12.

It will be further apparent that while I have shown and described my invention in the preferred forms, many changes and modifications may be made in the structure disclosed without departing from the spirit of the invention, defined in the following claims.

Having thus described my invention and illustrated its use, what I claim as new and desire to secure by Letters Patent, is—

1. In a radio broadcast receiver, the combination with a rotatable control member thereof, of an indicator dial including an outwardly dished portion carrying a continuous series of dialing markings, said portion being located below the axis of the dial and angularly disposed to the normal line of observation whereby said markings may be viewed over a wide angle above said normal line.

2. In a radio broadcast receiver, in combination with a control member thereof, an indicating dial including a translucent outwardly dished portion adapted to hold dialing markings, said portion being located below the axis of the dial and angularly disposed to the normal line of observation, and an illuminating device suitably located to transmit light through said translucent portion whereby said markings below the axis of the dial may readily be viewed over a wide angle of observation.

3. In a radio broadcast receiver, the combination with a control member thereof, of an indicating dial comprising a disk for rotation with said control member including an outwardly dished portion adapted to hold peripheral dialing markings, said dished portion being angularly disposed to the normal line of observation whereby the markings on the lower periphery of the outwardly dished portion may be viewed over a wide angle above said normal line of observation.

4. In a radio broadcast receiver, in combination with a control member thereof, an indicating dial comprising a disk including an outwardly dished portion adapted to hold a translucent material including dialing markings, said portion being angularly disposed to the normal line of observation and illuminating means for transmitting light through said translucent portion and the markings thereof, whereby said markings may be viewed over a wide angle above said normal line of observation.

5. In a radio broadcast receiver, in combination with a control member disposed perpendicularly to the frontal panel thereof, an outwardly dished indicator dial therefor capable of being moved for various settings of said control, and including a portion adapted to hold dialing markings, said portion being angularly disposed to the normal line of observation, an opening in said frontal panel below the dial axis through which said dialing markings may be observed from above, and a reference point mounted within said opening.

6. In a radio broadcast receiver, in combination with a control member disposed perpendicularly to the frontal panel thereof, an indicator dial therefor capable of being moved for various settings of said control, and including an outwardly dished portion adapted to hold dialing markings, an opening in said frontal panel below the dial axis through which said dialing markings may be observed, and an escutcheon plate in said opening adapted to mount a reference point.

7. In a radio broadcast receiver, in combination with a control shaft perpendicularly disposed to the frontal panel thereof, means for moving said control shaft for various settings of said receiver comprising a disk member carried by said shaft and means engaging said disk member for micrometrically adjusting said shaft, and an outwardly dished portion associated with said disk adapted to hold dial markings angularly disposed to the normal line of observation, whereby said markings may be viewed over a wide angle above said line of observation.

8. In a radio broadcast receiver including a rotatable control shaft perpendicularly disposed to the panel thereof, the combination therewith of an indicator mounted on said shaft and having an outwardly dished dial, and means for mounting a reference or zero point in close proximity thereto.

9. In a radio broadcast receiver including a rotatable control shaft perpendicularly disposed to the panel thereof, the combination therewith of an indicator mounted on said shaft and including an annular outwardly dished dial having markings interiorly on said dished portion.

10. In a radio broadcast receiver including a control shaft perpendicularly disposed to the panel thereof, in combination therewith, an indicator including a dial having an outwardly dished portion and having markings interiorly on said dished portion, an opening in said panel, and mounting means for a reference or zero point whereby the same may be brought in close proximity to said markings.

11. In a radio broadcast receiver including a control shaft perpendicularly disposed to the panel thereof, in combination therewith, an indicator including a dial having an outwardly dished portion of translucent material and having markings interiorly on said dished portion, an opening in said panel below the dial axis and mounting means for a reference or zero point whereby the same may be brought in close proximity to said markings.

12. For use with a radio broadcast receiver having a perpendicularly disposed rotatable control shaft, a disk adapted to be mounted on said shaft including an outwardly dished portion adapted to hold dial markings interiorly of said dished portion.

13. For use with a radio broadcast receiver having a perpendicularly disposed rotatable control shaft, a disk adapted to be mounted on said shaft including an outwardly dished portion, and a translucent strip including dial markings mounted on the dished portion of said disk.

14. For use with a radio broadcast receiver having a perpendicularly disposed control shaft, a disk adapted to be mounted on said shaft, and a separate dialing strip mounted on said disk and forming therewith an outwardly dished portion, said strip having dial markings on said dished portion.

15. For use with a radio broadcast receiver having a perpendicularly disposed control shaft, a disk adapted to be mounted on said shaft, and a translucent, strip mounted on said disk and forming therewith an outwardly dished portion, said strip having dial markings interiorly of said dished portion.

16. For use with a radio broadcast receiver or the like having a perpendicularly disposed control shaft, a disk including control shaft mounting means, a plane peripheral portion formed concentrically therewith for engagement with micrometric adjusting means, and a dished portion having dialing markings thereon.

17. For use with a radio broadcast receiver or the like having a perpendicularly disposed control shaft, a disk including control shaft mounting means, a peripheral portion formed concentrically therewith for engagement with micrometric adjusting means, and an outwardly dished portion having dialing markings on the inner surface thereof.

18. In a radio broadcast receiver, the combination with a control member disposed perpendicularly to the frontal panel thereof, of an indicator dial comprising a disk adapted for rotation with said control member and including an outwardly dished portion adapted to hold dial markings interiorly thereof, said markings being disposed to be visible at an angle above normal through an opening in said panel below the axial line of said control.

Signed at New York in the county of New York and State of New York, this 11th day of Sept. A. D. 1928.

JOSEPH A. FLANZER.